United States Patent
Williams

(10) Patent No.: US 7,711,760 B2
(45) Date of Patent: May 4, 2010

(54) FILE UPDATE AVAILABILITY CHECKING IN A HIERARCHAL FILE STORE

(75) Inventor: Clark Williams, Madison, AL (US)

(73) Assignee: Red Hat, Inc., Raleigh, NC (US)

( * ) Notice: Subject to any disclaimer, the term of this patent is extended or adjusted under 35 U.S.C. 154(b) by 220 days.

(21) Appl. No.: 11/565,460

(22) Filed: Nov. 30, 2006

(65) Prior Publication Data
US 2008/0133922 A1    Jun. 5, 2008

(51) Int. Cl.
*G06F 17/30*    (2006.01)
(52) U.S. Cl. ............... 707/825; 707/829; 713/165; 713/166
(58) Field of Classification Search ............ 717/168
See application file for complete search history.

(56) References Cited

U.S. PATENT DOCUMENTS

| | | | |
|---|---|---|---|
| 6,968,550 B2 | 11/2005 | Branson et al. | |
| 6,976,251 B2 | 12/2005 | Meyerson | |
| 6,978,281 B1 * | 12/2005 | Kruy et al. | 707/203 |
| 6,990,660 B2 | 1/2006 | Moshir et al. | |
| 6,996,818 B2 | 2/2006 | Jacobi et al. | |
| 7,080,372 B1 | 7/2006 | Cole | |
| 7,093,246 B2 | 8/2006 | Brown et al. | |
| 7,096,464 B1 | 8/2006 | Weinmann | |
| 2004/0044702 A1 * | 3/2004 | Ferreira Alves et al. | 707/203 |
| 2005/0050342 A1 * | 3/2005 | Boivie et al. | 713/193 |
| 2005/0071371 A1 | 3/2005 | Woodhouse | |

* cited by examiner

*Primary Examiner*—Cam Y T Truong
(74) *Attorney, Agent, or Firm*—Blakely, Sokoloff, Taylor & Zafman LLP

(57) ABSTRACT

A device includes a computer processor and a file store coupled to the computer processor. The file store includes a hierarchal file system. A plurality of files is located in the hierarchal file system. Each of the plurality of files is associated with digital signature metadata determined by a content of the file. A plurality of directories is located in the hierarchal file system. Digital signature metadata is associated with each of the plurality of directories and determined by the digital signature metadata associated with the directories and the files that are direct descendants of the directory. An update module determines if an update to any of the plurality of files is available based on the digital signature metadata associated with a root directory in the plurality of directories.

9 Claims, 3 Drawing Sheets

FILE UPDATE AVAILABILITY CHECKING IN A HIERARCHAL FILE STORE

TECHNICAL FIELD

Embodiments of the present invention relate to updating files, and more specifically to checking for the availability of updates for files in a hierarchal file store including multiple files.

BACKGROUND

Computer based systems may use a large number of interrelated files to implement a system. The files may require updating from time to time to provide new features and to correct errors that are found in the files. The updating of files may require that a number of files be updated in ways that depend on the interrelationship of the files.

It is generally necessary to take an inventory of a large number of files in the system to determine whether an update is available and, if an update is available, what files need to be updated in order to maintain a coherent system. In a general purpose computer with large amounts of file storage and random access memory, it is possible for the computer to inventory the files and determine the appropriate updating strategy for the system autonomously.

Embedded systems are computers or computer-like processors that provide the functionality for devices that may not be perceived as a computer. For example, devices such a cellular telephones or digital video recorders may include a computer or a computer-like processor that employs a general purpose operating system with a hierarchal file system. Such devices may have file storage and random access memory that is just sufficient to support the operating system and the programs necessary to provide the desired functionality for the embedded system for the device in which the system is embedded.

A device with an embedded system may lack the resources necessary to identify file updates using the mechanisms that are appropriate for a general purpose computer. It would be desirable to have a mechanism that allows file updates for embedded systems to be identified efficiently with the resources typically available in such devices. A database may be used to store items of information in a manner that permits a particular item to be accessed efficiently. The database and the mechanism to retrieve items from the database may be part of a database server. The mechanism to accept requests for items in the database from a user and to display requested items to the user may be part of a client.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
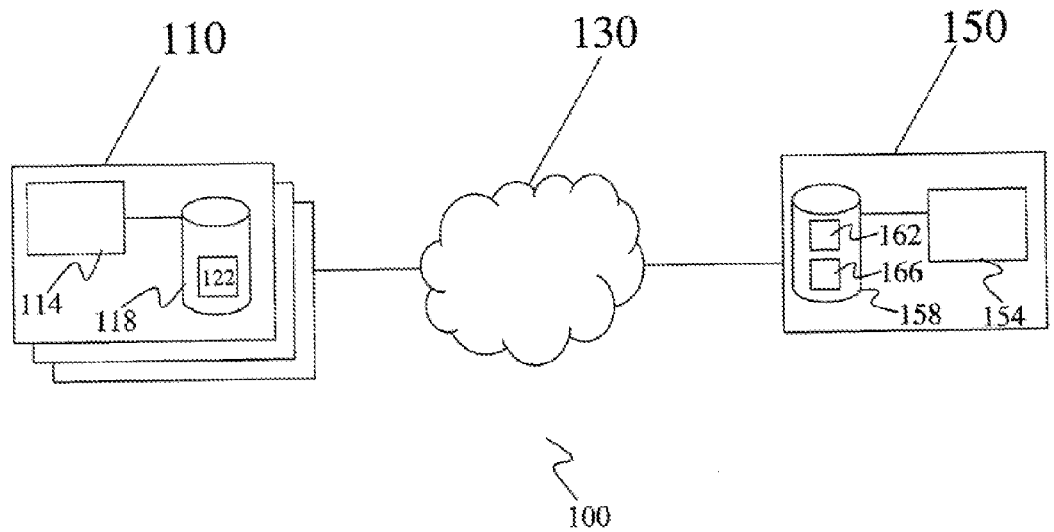
FIG. 1 is a block diagram of a system in which embodiments of the invention may operate.

FIG. 1 is a block diagram illustrating an example of a networked computer system 100 in which an embodiment of the present invention may be used. As shown in FIG. 1, the system 100 includes a number of remote client devices (clients 110), which in this embodiment may include wired telephone terminals, cellular telephones, personal entertainment systems, digital video recorders, and other devices that include an embedded system that provides functionality for the device. The embedded system may include, among other components, a processing unit (processor 114) and one or more memory storage devices (storage device 118). The storage device 118 may be any type of permanent or semi-permanent storage (e.g., hard disc drives, memory cards, and the like).

The storage device 118 may be used to store any number of files 122 in a hierarchal file system. The files may include vendor supplied files which are files supplied by the manufacturer or vendor of the device to provide the "as sold" functionality of the device and user supplied files which are files added or generated by the user of device in the course of use or to provide additional functionality not provided by the vendor. The files may include program files and data files. Program files typically remain unchanged during normal operation. Data files may remain unchanged if they contain only data, such as images, that supports the functionality of related program files. Other data files may change in the course of normal usage, such as when the data files include user set preferences for the operation of related program files. The vendor supplied files 122 may need to be updated or revised from time-to-time.

As also shown in FIG. 1, client devices 110 may be linked to a server system or server 150 via a data communications network 130 to facilitate the transmission of information and data between clients 110 and server 150. Examples of the network 130 may include public service telephone networks (PSTN), cellular telephone networks, broadband networks, such as cable or satellite television networks, and the Internet or other similar data networks, such as private WANs, LANs and the like. Client devices may be continuously connected to the network or may connect on demand.

In the embodiment of FIG. 1, the server 150 may represent, for example, a manufacturer or vendor system from which software revisions may be distributed to client devices 110. The server 150 may include a processor 154 and a number of memory storage devices (e.g., hard disc and the like) (storage device 158). The storage device 158 may store software programs 162, 166 that represent various versions of corresponding files implemented on client devices 110. The various versions may represent revision levels of the software, different localizations of the software, different functional levels of the software, and so on.

Vendor supplied files 122 stored on client devices 110 may be updated such that they match newer versions (e.g., file 162) stored on the server 150. For example, file 162 may represent a newer version of a software program offered by a software vendor or manufacturer to customers or owners of older versions of the program (e.g., program 122). Thus, the newer versions of the program may be available for downloading from a server computer associated with the vendor (e.g., server 150) to the client computers (e.g., clients 110) via the Internet (e.g., network 130). Client devices 110 may use embodiments of the present invention to determine if an update is available for the files stored on the client device.

Vendor supplied files 122 stored on client devices 110 may be upgraded such that they provide a versions (e.g., file 162) stored on the server 150 that changes the functionality of the client device 110. Client devices 110 may use embodiments of the present invention to determine what level of functionality the files stored on the client device currently provide and/or what files need to sent to the client device to provide the desired level of functionality.

The present invention provides a method of checking files located in a hierarchal file system of a client device to determine the version of the installed software. The hierarchal structure of the file system is used to provide an efficient mechanism for identifying the present file configuration of the embedded system. This information may be used in any of a variety of ways to identify the update that should be used by the embedded system.

Figure 2:
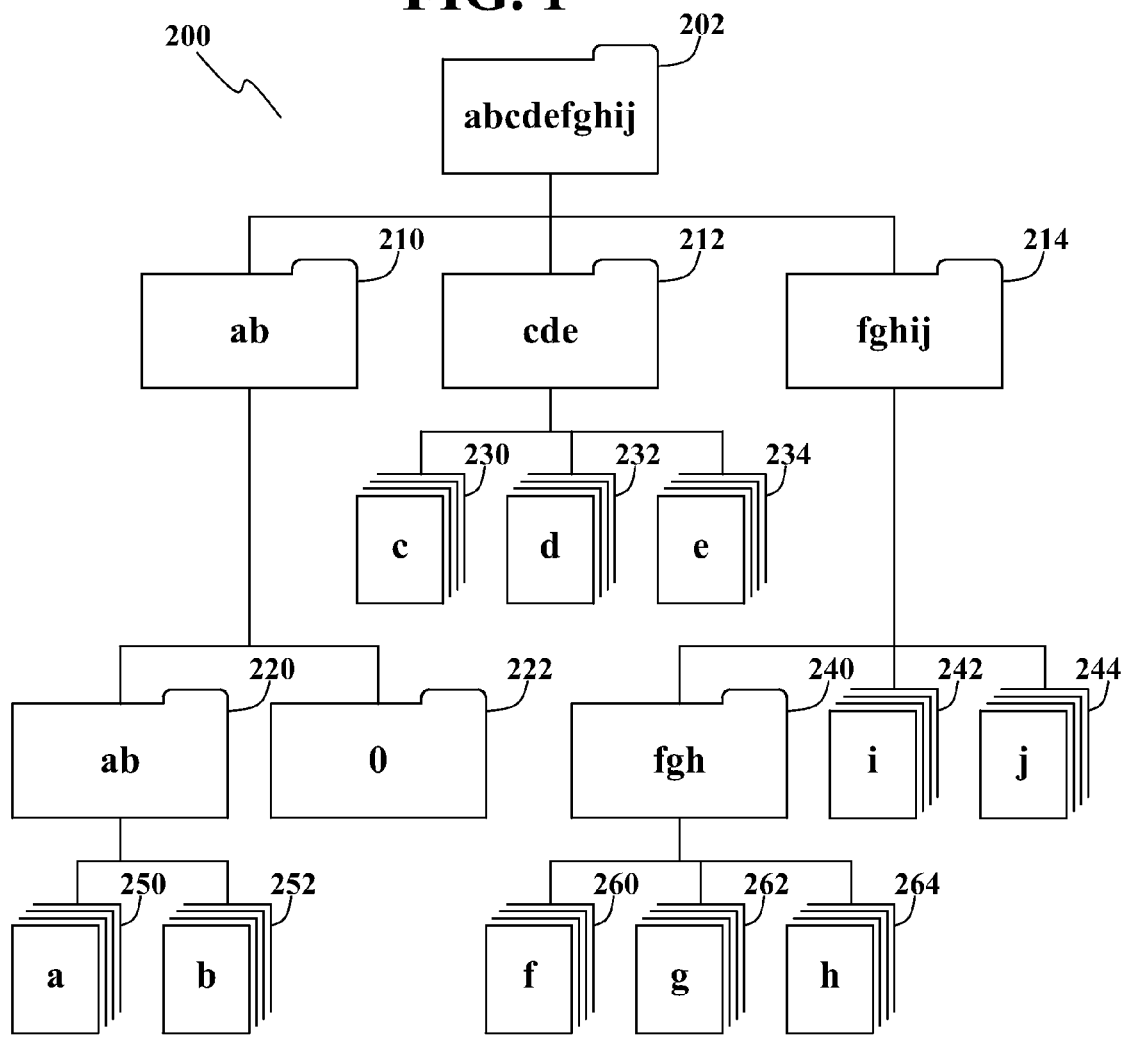
FIG. 2 is a schematic representation a directory that embodies the invention.

FIG. 2 is a hierarchal file system 200 that may be used with embodiments of the present invention. The hierarchal file system 200 may be located on the storage device 118 of the client device 110. The hierarchal file system 200 includes files and directories. Each file 230 is associated with a directory 212 and the file is said to be directly descended from the directory. Each directory 214 may or may not include files 242, 244 and may or may not include directories 240, which may be referred to as subdirectories of the directory from which they descend. The hierarchal file system 200 includes a directory 202 that does not descend from another directory and this is termed the root directory. All other directories and files descend directly or indirectly from the root directory 202.

For each of a plurality of vendor files 250 located in the hierarchal file system 200, the vendor may associate digital signature metadata with the file. In FIG. 2, the digital signature metadata associated with a file is illustrated as a single letter such as "a" for file 250. The digital signature metadata is determined by a content of the files. For example, a hash value determined from the contents of the file may be used as the digital signature metadata. For example, the digital signature metadata may be message digest algorithm five (MD5) or secure hash algorithm one (SHA-1). It will be appreciated that the cryptographic security of the digital signature metadata is not significant, but only the high probability of providing a unique value for any given file.

Digital signature metadata will typically be short in comparison to the length of the file with which it is associated. The digital signature metadata may be stored in a variety of manners so long as it is possible to retrieve the digital signature metadata for a given file. For example, the digital signature metadata may be stored in an inode, a data structure used in Unix-style file systems. An inode is associated with each file or directory and stores basic information about the file or directory. The digital signature metadata may also be stored as an extended attribute of a Linux file system.

Each of a plurality of directories located in the hierarchal file system is associated with digital signature metadata. For a directory, the digital signature metadata is determined by the digital signature metadata associated with the directory and files that are direct descendants of the directory. This may result in digital signature metadata being associated with a root directory of a hierarchal file system that is determined directly or indirectly by all of the files and directories in the hierarchal file system. In general, the digital signature metadata for a directory may be determined by using the same signature algorithm used for files, using each file's signature as the input to the signature calculation for the directory.

Digital signature metadata being associated with a file means the file is version controlled by the vendor. Digital signature metadata being associated with a directory means all vendor version controlled files below this directory are intact. Files and directories having valid vendor applied digital signature metadata may be referred to as tagged.

The application of digital signature metadata may be illustrated using the hierarchal file system 200 of FIG. 2 as an example. Three vendor files 230, 232, 234 descend from directory 212. The three vendor files 230, 232, 234 have had digital signature metadata applied by the vendor and represented as "c", "d", and "e" respectively. The directory 212 that contains the three vendor files 230, 232, 234 also has digital signature metadata applied by the vendor. The digital signature metadata is represented as "cde" to indicate that the digital signature metadata is determined from the digital signature metadata of the three vendor files 230, 232, 234 that directly descend from the directory. It will be appreciated that the use of letters is illustrative only. The digital signature metadata of directories and files will typically be of the same length. It typically will not be possible to ascertain the digital signature metadata of files from the digital signature metadata of the directory from which they descend.

Continuing with the illustration of the invention, directory 240 has digital signature metadata applied by the vendor and represented as "fgh" as determined from the digital signature metadata—"f", "g", and "h"—of the three vendor files 260, 262, 264 that directly descend from the directory.

Directory 214 has digital signature metadata applied by the vendor and represented as "fghij" as determined from the digital signature metadata—"fgh", "i", and "j"—of the subdirectory 240 and the two vendor files 242, 244 that directly descend from the directory.

Directory 220 has digital signature metadata applied by the vendor and represented as "ab" as determined from the digital signature metadata—"a" and "b"—of the two vendor files 250, 252 that directly descend from the directory.

Directory 222 does not have digital signature metadata, represented as "0", because there are no files or directories having digital signature metadata that descend from the directory. Directories or files that do not have digital signature metadata may have a null value in the field used to hold digital signature metadata or the digital signature metadata field may not be present. Both methods may be used in the same hierarchal file system.

Directory 210 has digital signature metadata applied by the vendor and represented as "ab" as determined from the digital signature metadata, "ab", of the one subdirectory 220 having digital signature metadata that directly descend from the directory. The subdirectory 222 that does not have digital signature metadata does not take part in the determination of the digital signature metadata for the directory 210.

The root directory 202 has digital signature metadata applied by the vendor and represented as "abcdefghij" as determined from the digital signature metadata—"ab", "cde", and "fghij"—of the three subdirectories 210, 212, 214 that directly descend from the root directory. It will be appreciated that the digital signature metadata associated with the root directory is determined, directly or indirectly, by every file in the hierarchal file system 200 that has digital signature metadata applied by the vendor.

The need to apply digital signature metadata to files and directories may be limited to the vendor because the vendor will not be able to supply updates for files not initially supplied by the vendor. Therefore, files not supplied by the vendor and directories containing such files may not require that digital signature metadata be associated with them. This means that the client device 110 may not need to determine digital signature metadata during routine file operations. Thus, the time required to determine digital signature metadata is not as critical as it might be if it was determined by the client device for each new file added to the hierarchal file system. Nonetheless, the client device 110 may have the capability of determining digital signature metadata from the file contents. Client determined digital signature metadata may be compared with the vendor applied digital signature metadata to verify the integrity of the file. File verification may be used during the process of supplying files for upgrading.

The file system 200 of an embedded system will typically be prepared by the manufacturer or vendor of the embedded system and transferred to the embedded system as a complete image of the file system. Thus, the digital signatures for the files and directories of the hierarchal file system will be computed by the manufacturer of the embedded system when preparing the master image of the file system to be loaded.

File operations—such as creation, modification, or deletion—for files that do not have vendor applied digital signature metadata will not affect the digital signature metadata of any directory. File operations for files with vendor applied digital signature metadata will invalidate the digital signature metadata for that file all directories that contain the file upwardly to the root directory. Files and directories with invalid digital signature metadata may be referred to as untagged. Invalidating the digital signature metadata may be carried out by replacing the digital signature metadata with a null or invalid value or by removing the association with digital signature metadata. Since invalidation of digital signature metadata does not require computation of new signatures, it may be accomplished relatively quickly.

Figure 3:
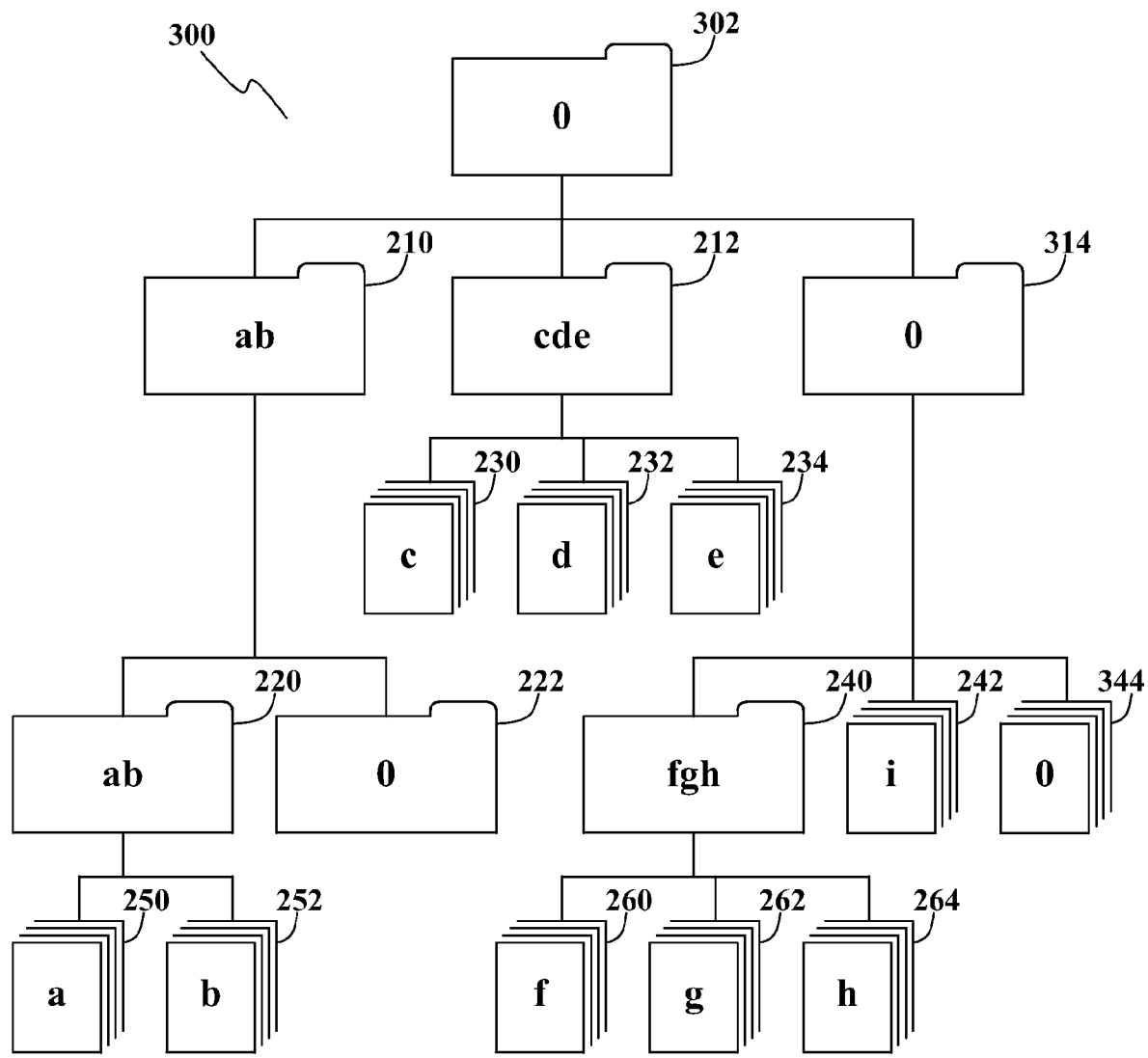
FIG. 3 is a schematic representation of the directory of FIG. 3 after file operations.

The result of a file operation on a tagged file in the hierarchical file system 200 of FIG. 2 is shown in FIG. 3. The file operation on the previously tagged file 344 causes the file to be untagged as indicated by "0". The file may be untagged by setting the digital signature metadata associated with the file to a null or invalid value or by removing the digital signature metadata associated with the file.

Untagging the previously tagged file 344 causes the directory 314 from which the file descends to be untagged as indicated by "0". Untagging the previously tagged directory 314 causes the directory 302, which in this case is the root directory, from which the previously tagged directory descends to be untagged as indicated by "0". Thus it can be determined that the vendor version controlled files are not intact by merely checking the root directory 302 and determining that it is untagged.

An embedded device in which none of the vendor tagged files stored in the hierarchal file system have been removed or modified by the user will have valid digital signature metadata associated with the root directory. The root directory digital signature metadata may be transmitted to a server that determines the availability of an update for the device by using the digital signature metadata to access a database. For example, there may be a relatively limited number of file configurations that have been provided by the manufacturer and each of these configurations will be associated with a unique digital signature metadata value for the root directory. Upon receipt of a known digital signature metadata for the root directory, the server will be able to identify whether an update is available and what that update consists of. Once the appropriate update is identified, the actual updating process may be carried out by any of a variety of known methods.

The present invention may be used to merely identify that the embedded system can no longer be updated by the vendor.

In one embodiment of the invention, the vendor may only provide updates for embedded systems where all of the vendor tagged files are unchanged, such as the file system 200 of FIG. 2. The availability of an update can be determined by examining the digital signature metadata associated with the root directory. If any vendor tagged file has been changed anywhere in the hierarchal file system, the digital signature metadata associated with the root directory will no longer be valid reflecting the fact that the overall hierarchal file system no longer corresponds to any vendor-provided file system, such as the file system 300 of FIG. 3.

Other embodiments of the invention may be used to probe the embedded system further to see whether a portion of the hierarchal file system can be updated by the vendor when the digital signature metadata associated with the root directory is invalid. If updates to a portion of the hierarchal file system are supported by the vendor, the digital signature metadata of directories that are descendants of the root directory may be examined when the root directory is untagged. When a subdirectory associated with valid digital signature metadata is located, the vendor server can be queried to determine if an update is available for the portion of the hierarchal file system that descends from that subdirectory.

For example, if the file system 300 of FIG. 3 is being checked for the availability of an update, it will be determined that at least one of the vendor version controlled files has been changed by the user because the root directory 302 is untagged. In embodiments that permit a partial update, the directories 210, 212, 314 that descend from the untagged root directory 302 will be examined. It would be determined that two directories 210, 212 have valid tags and the client device would check to see if updates are available for either of these two branches of the file hierarchy.

In some embodiments, the search of directories that are descendants of the root directory may be limited to a predetermined number of levels below the root directory. This may limit the number of update configurations that have to be maintained by the server. For example, the levels of subdirectories to be examined might be limited to one and this would mean that the untagged subdirectory 314 would not be checked for updates.

In other embodiments, the search of directories that are descendants of the root directory may continue to the full depth of the file system. In these embodiments, the subdirectory 240 that descends from untagged subdirectory 314 would be examined. It would be determined that the subdirectory 240 has a valid tag and the client device would check to see if an update is available for this subbranch of the file hierarchy.

In some embodiments, untagged directories may be searched for tagged files and the server queried for the availability of updates for individual files. In these embodiments, the files 242, 344 that descend from the untagged subdirectory 314 would be examined. It would be determined that one file 242 has a valid tag and the client device would check to see if an update is available for this individual file. It would further be determined that the other file 344 is untagged and the client device would not check for an update to this file. In embodiments that search to the file level, the directories may or may not be limited to a predetermined number of levels below the root directory. If the search is limited to a predetermined number of levels of subdirectories, the file search will be limited to the searched subdirectory levels.

Figure 4:
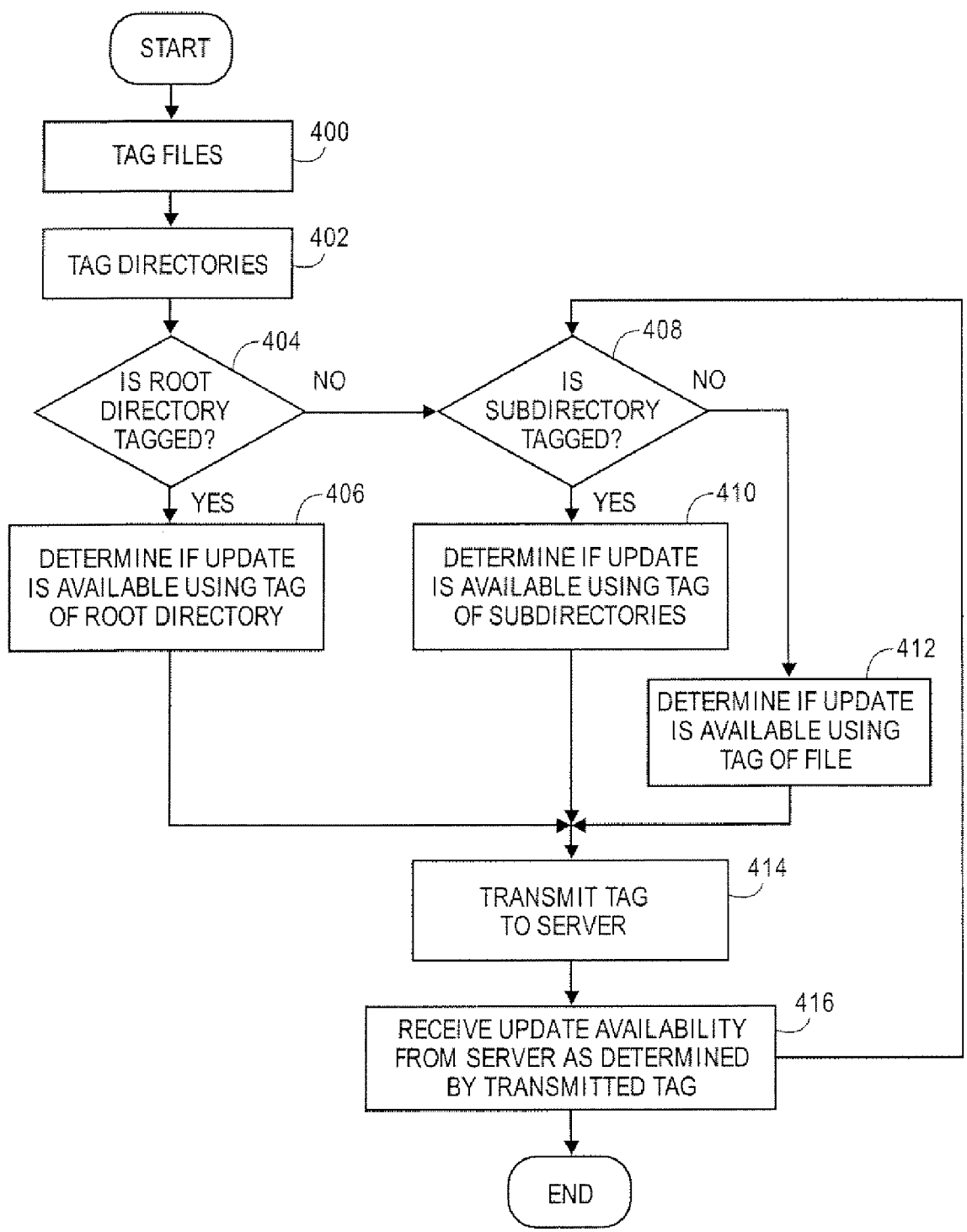
FIG. 4 is a flowchart of a method for checking files located in a hierarchal file system for availability of an update that embodies the invention.

FIG. 4 shows a flowchart for a method that embodies the invention. The method checks files located in a hierarchal file system for availability of an update. Each of a plurality of files located in a hierarchal file system is associated with digital signature metadata determined by a content of the file 400. The files associated with digital signature metadata may be termed tagged files. The tagged files may be files in a hierarchal file system for an embedded system in a client device. The tagged files may be under version control by a vendor of the client device.

Each of a plurality of directories located in the hierarchal file system is associated with digital signature metadata 402 determined by digital signature metadata associated with the directories and the files that are direct descendants of the directory. The directories associated with digital signature metadata may be termed tagged directories. The association of digital signature metadata with directories will propagate upwardly to associate digital signature metadata with a root directory because of the structure of the hierarchal file system.

It can be determined if an update to any of the plurality of files is available based on the digital signature metadata associated with a root directory in the plurality of directories. If the root directory is tagged 404, YES, then it is known that none of the tagged files in the hierarchal file system have been altered. The digital signature metadata associated with the root directory may be used to determine if an update to any of the plurality of files is available 406. When the root directory is tagged the update may be an update of the entire hierarchal file system.

The client device may determine if the update to any of the plurality of files is available by transmitting the digital signature metadata to a server, which may be maintained by the vendor of the client device 414, and then receiving an indication of the availability of the update from the server 416. The server may determine the availability of the update by using the digital signature metadata provided by the client device to access a database of known digital signature metadata values.

If there is at least one untagged file located in the hierarchal file system that was previously a tagged file, the file operation that results in the untagging of the file will further cause each of the directories from which the untagged file is a descendant to be untagged. Since all files in a hierarchal file system are descendants of the root directory, untagging any tagged file causes the root to become untagged. the method further comprises determining if the update to any of the plurality of files is available based on the digital signature metadata of directories that are descendants of the root directory. If the root directory is untagged 404, NO, then it is known that at least one of the tagged files in the hierarchal file system has been altered. Files may be untagged by associating the untagged file with digital signature metadata having a null value. Files may also be untagged removing the association of the untagged file with digital signature metadata. It will be appreciated that deleting a tagged file can be viewed as removing the association of the untagged file with digital signature metadata.

In some embodiments of the invention, the client device may check for updates of a portion of the hierarchal file system. If a subdirectory is tagged 408, YES, the digital signature metadata associated with the subdirectory may be used to determine if an update to the files that descend from that subdirectory is available 410. When only a subdirectory is tagged the update will be limited to an update of the portion of the hierarchal file system that descends from the subdirectory. The client device may query a server 414, 416 to determine the availability of an update in a similar to manner as used when the root directory is tagged.

In some embodiments of the invention, the client device may check for updates of individual files. If a subdirectory is untagged 408, NO, the individual files that descend directly from that subdirectory may be examined for associated digital signature metadata. The digital signature metadata associated with an individual file may be used to determine if an update to that file is available 412. The client device may query a server 414, 416 to determine the availability of an update for an individual file in a similar to manner as used for directories.

The process of checking subdirectories for tagged subdirectories or tagged files may be performed recursively, either to a predetermined depth or for the entire hierarchal file system, as suggested by the flow arrow that moves from receiving update availability 416 to determining if the subdirectory is tagged 408. It will be appreciate that recursively checking all or part of the hierarchal file system requires additional decision steps such as determining if an untagged directory is being checked and determining if there are directories and/or files that descend from the untagged subdirectory. The details of such recursion have not been shown in detail to more clearly show the embodiment of the invention.

The invention may be embodied in a processor-readable medium having a sequence of instructions. The sequence of instructions, when executed by a processor 114 (FIG. 1), causing the processor to perform a method for checking files located in a hierarchical file system 200 (FIG. 2) for availability of an update. The term "processor-readable medium" should be taken to include a single medium or multiple media (e.g., a centralized or distributed database, and/or associated caches and servers) that store the one or more sets of instructions. The term "processor-readable medium" shall also be taken to include any medium that is capable of storing, a set of instructions for execution by the machine and that cause the machine to perform any one or more of the methodologies of the present invention. The term "processor-readable medium" shall accordingly be taken to include, but not be limited to, solid-state memories and optical and magnetic media. The term "article of manufacture comprising a processor-readable medium" should be taken to include all forms of "processor-readable medium" that are also patentable subject matter. A computer readable storage medium includes solid-state memories and optical and magnetic storage media.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in that art.

What is claimed is:

1. A device comprising:
 a computer processor;
 a memory;
 a file store coupled to the computer processor, the file store arranged as a hierarchal file system and including:
 a plurality of files, each file of the plurality of files associated with digital signature metadata that is a hash value determined from content of the file, wherein the digital signature metadata associated with a file is invalidated if the file is at least one of created, modified, or deleted; and
 a plurality of directories, each directory of the plurality of directories associated with digital signature metadata that is a hash value determined from digital signature metadata of the directories and of the files that are direct descendants of the directory, wherein the digital signature metadata associated with a directory is invalid if the digital signature metadata of any of the direct descendants of the directory is invalid; and an update module coupled to the computer processor and the file store, the update module executed to:
provide a high probability of a provided unique value for the file;
determine if digital signature metadata of a root directory of the plurality of files and the plurality of directories is a valid hash value or an invalid value;
if the digital signature metadata of the root directory is the valid hash value, then using the valid hash value to determine if an update to any of the plurality of files and plurality of directories is available; and
if the digital signature metadata of the root directory is the invalid value, then examining the digital signature metadata of each directory of the plurality of directories and files descending from the root directory to determine whether the digital signature metadata of each directory is a valid hash value or an invalid value and, for all of the plurality of directories and files with a valid hash value, determining whether an update is available for the directories and the files;
wherein the update module further determines what level of functionality the files stored on a client device to send files to the client device to provide desired level of functionality, determines if an update to any of the plurality of files is available by transmitting the digital signature metadata of the root directory to a server that determines the availability of the update by using digital signature metadata to access a database, and receiving an indication of the availability of the update from the server.
wherein at least one file located in the hierarchal file system is undated from tagged to untagged, wherein each directory from which untagged file is a descendant is undated from tagged to untagged when the at least one file becomes untagged, and wherein the untagged directory includes digital signature metadata having a null value, wherein the digital signature metadata for a directory is determined by using same signature algorithm used for files where each file's signature as a input to signature calculation for a directory.

2. The device of claim 1 wherein the untagged directory is not associated with digital signature metadata.

3. The device of claim 1, wherein the root directory is associated with digital signature metadata of a file that is a descendant of the root directory and is identified as untagged as a result of a file operation on a file.

4. A method of checking files located in a hierarchal file system for update availability, the method comprising:
associating each file of a plurality of files located in the hierarchal file system with digital signature metadata that is a hash value determined from content of the file, wherein the digital signature metadata associated with the file is invalidated if the file is at least one of created, modified, or deleted;
providing a high probability of a provided unique value for the file;
associating each directory of a plurality of directories located in the hierarchal file system with digital signature metadata that is a hash value determined from digital signature metadata of the directories and of the files that are direct descendants of the directory, wherein the digital signature metadata associated with the directory is invalid if the digital signature metadata of any of the direct descendants of the directory is invalid;
determining, by an update module connected to the hierarchal file system, if digital signature metadata of a root directory of the plurality of files and the plurality of directories is a valid hash value or an invalid value;
if the digital signature metadata of the root directory is the valid hash value, then using, by the update module, the valid hash value to determine if an update to any of the plurality of files and the plurality of directories is available; and
if the digital signature metadata of the root directory is the invalid value, then examining the digital signature metadata of each directory of the plurality of directories and the files descending from the root directory to determine whether the digital signature metadata of each directory is a valid hash value or a invalid value and, for all of the plurality of directories and the files with a valid hash value, determining whether an update is available for the directories and the files;
determining what level of functionality the files stored on a client device to send the files to the client device to provide desired level of functionality;
determining if an update to any of the plurality of files is available by transmitting the digital signature metadata of the root directory to a server that determines availability of the update by using digital signature metadata to access a database; and
receiving an indication of the availability of the update from the server;
wherein at least one file located in the hierarchal file system is undated from tagged to untagged, wherein each directory from which untagged file that is a descendant is undated from tagged to untagged when the at least one file becomes untagged, and wherein the untagged directory includes digital signature metadata having a null value, wherein the digital signature metadata for a directory is determined by using a same signature algorithm used for files where each file's signature is used as a input to signature calculation for a directory.

5. The method of claim 4, wherein untagged directory is not associated with digital signature metadata.

6. A device for checking files located in a hierarchal file system for update availability, the device comprising:
a computer readable storage medium that stores sequence of instructions;
a processor;
means for associating each file of a plurality of files located in the hierarchal file system with digital signature metadata that is a hash value determined from content of the file, wherein the digital signature metadata associated with the file is invalidated if the file is at least one of created, modified, or deleted;
means for associating each directory of a plurality of directories located in the hierarchal file system with digital signature metadata that is a hash value determined from digital signature metadata of the directories and of the files that are direct descendants of the directory, wherein the digital signature metadata associated with the directory is invalid if the digital signature metadata of any of the direct descendants of the directory is invalid;
means for determining, by an update module connected to the hierarchal file system, if digital signature metadata of a root directory of the plurality of files and plurality of directories is a valid hash value or an invalid value;
if the digital signature metadata of the root directory is the valid hash value, then means for using, by the update module, the valid hash value to determine if an update to any of the plurality of files and the plurality of directories is available; and if the digital signature metadata of the root directory is the invalid value, then means for examining, by the update module, the digital signature metadata of said each directory of the plurality of directories and files descending from the root directory to determine whether the digital signature metadata of said each directory is a valid hash value or an invalid value and, for all of the plurality of directories and files with a valid hash value, determining whether an update is available for the directories and files; and an instruction for providing a high probability of a provided unique value for the file, wherein the update module determines what level of functionality the files stored on a client device to send files to the client device to provide desired level of functionality, determines if an update to any of the plurality of files is available by transmitting the digital signature metadata of the root directory to a server that determines the availability of the update by using the digital signature metadata to access a database, and receiving an indication of the availability of the update from the server;

wherein: at least one file located in the hierarchal file system is undated from tagged to untagged, wherein each directory from which untagged file is a descendant is undated from tagged to untagged when the at least one file becomes untagged, wherein the untagged directory includes digital signature metadata having a null value, and wherein the digital signature metadata for a directory is determined by using a same signature algorithm used for files where each file's signature is used as a input to signature calculation for a directory.

7. The device of claim 6, wherein untagged directory is not associated with digital signature metadata.

8. An article of manufacture comprising a processor-readable storage medium having a sequence of instructions, the sequence of instructions, when executed by a processor, causing the processor to perform a method for checking files located in a hierarchal file system for update availability, the method comprising:

associating each file of a plurality of files located in the hierarchal file system with digital signature metadata that is a hash value determined from content of the file, wherein the digital signature metadata associated with the file is invalidated if the file is at least one of created, modified, or deleted;

providing a high probability of a provided unique value for the file;

associating each directory of a plurality of directories located in the hierarchal file system with digital signature metadata that is a hash value determined from digital signature metadata of the directories and of the files that are direct descendants of the directory, wherein the digital signature metadata associated with the directory is invalid if the digital signature metadata of any of the direct descendants of the directory is invalid;

determining, by an update module connected to the hierarchal file system, if digital signature metadata of a root directory of the plurality of files and plurality of directories is a valid hash value or an invalid value;

if the digital signature metadata of the root directory is the valid hash value, then using, by the update module, the valid hash value to determine if an update to any of the plurality of files and the plurality of directories is available;

if the digital signature metadata of the root directory is the invalid value, then examining, by the update module, the digital signature metadata of each directory of the plurality of directories and the files descending from the root directory to determine whether the digital signature metadata of each directory is a valid hash value or an invalid value and, for all of the plurality of directories and the files with a valid hash value, determining whether an update is available for the directories and the files;

determining what level of functionality the files stored on a client device to send the files to the client device to provide desired level of functionality;

determining if an update to any of the plurality of files is available by transmitting the digital signature metadata of the root directory to a server that determines availability of the update by using digital signature metadata to access a database; and receiving an indication of the availability of the update from the server;

wherein at least one file located in the hierarchal file system is undated from tagged to untagged, wherein each directory from which untagged file that is a descendant is undated from tagged to untagged when the at least one file becomes untagged, wherein the untagged directory includes digital signature metadata having a null value, and wherein the digital signature metadata for a directory is determined by using a same signature algorithm used for files where each file's signature is used as a input to signature calculation for a directory.

9. The article of manufacture of claim 8, wherein the untagged directory is not associated with digital signature metadata.

* * * * *